(12) United States Patent
Bowler

(10) Patent No.: US 9,350,732 B1
(45) Date of Patent: May 24, 2016

(54) INTEGRITY PROTECTION FOR DATA STORAGE

(71) Applicant: Elliptic Technologies Inc., Kanata (CA)

(72) Inventor: Michael Kenneth Bowler, Ottawa (CA)

( * ) Notice: Subject to any disclaimer, the term of this patent is extended or adjusted under 35 U.S.C. 154(b) by 0 days.

(21) Appl. No.: 14/535,999

(22) Filed: Nov. 7, 2014

(51) Int. Cl.
*H04L 9/32* (2006.01)
*H04L 29/06* (2006.01)

(52) U.S. Cl.
CPC .................................. *H04L 63/0876* (2013.01)

(58) Field of Classification Search
CPC ..... H04L 63/0876; G06F 12/14; G06F 12/16; G06F 12/1491; G06F 15/167
USPC ........................................................ 713/170
See application file for complete search history.

(56) References Cited

U.S. PATENT DOCUMENTS

| | | | | |
|---|---|---|---|---|
| 8,909,601 B2 * | 12/2014 | Moir | | 707/624 |
| 9,077,772 B2 * | 7/2015 | Hui | | 1/1 |
| 9,128,750 B1 * | 9/2015 | August | | G06F 9/467 |
| 2002/0073276 A1 * | 6/2002 | Howard | | G06F 11/1471 |
| | | | | 711/113 |
| 2004/0193802 A1 * | 9/2004 | Meiri | | G06F 12/0868 |
| | | | | 711/118 |
| 2005/0154866 A1 * | 7/2005 | Steely | | G06F 9/383 |
| | | | | 712/228 |
| 2007/0242683 A1 * | 10/2007 | Pelletier | | H04L 63/0428 |
| | | | | 370/401 |
| 2008/0177756 A1 * | 7/2008 | Kosche | | G06F 11/3447 |
| | | | | 1/1 |
| 2008/0244533 A1 * | 10/2008 | Berg | | G06F 11/3447 |
| | | | | 717/128 |
| 2009/0125465 A1 * | 5/2009 | Berg | | G06F 11/3616 |
| | | | | 706/17 |
| 2011/0213775 A1 * | 9/2011 | Franke | | G06F 17/30584 |
| | | | | 707/737 |
| 2012/0079032 A1 * | 3/2012 | Vash | | H04L 67/10 |
| | | | | 709/206 |
| 2012/0167115 A1 * | 6/2012 | Lynn | | G06F 9/544 |
| | | | | 719/313 |
| 2012/0198267 A1 * | 8/2012 | Das | | G06F 13/1605 |
| | | | | 713/600 |
| 2013/0080694 A1 * | 3/2013 | Iyer | | G11C 11/40618 |
| | | | | 711/106 |
| 2013/0110694 A1 * | 5/2013 | Acuna-Rohter | | G06Q 40/00 |
| | | | | 705/37 |
| 2013/0283347 A1 * | 10/2013 | Hui | | H04L 67/12 |
| | | | | 726/3 |
| 2014/0310714 A1 * | 10/2014 | Chan | | G06F 17/30598 |
| | | | | 718/102 |
| 2015/0234869 A1 * | 8/2015 | Chan | | G06F 17/30312 |
| | | | | 707/603 |

* cited by examiner

*Primary Examiner* — Dant Shaifer Harriman

(57) ABSTRACT

A system for protecting the integrity of a memory system maintains an age counter and an opportunity counter for each of multiple memory blocks; maintains an epoch counter for the memory system; writes data in a selected memory block; increases the local sequence number of the selected memory block; updates the opportunity counter for the selected memory block if the local sequence number of the selected memory block rolls over; computes a message authentication code (MAC) in the selected memory block based on a global sequence number and the local sequence number; updates the age counter and the opportunity counter for any non-selected memory blocks if the opportunity counter for the non-selected memory blocks does not match the LSB of the epoch counter for the non-selected memory blocks; and computes a new MAC for any memory block for which the updating is performed.

10 Claims, 2 Drawing Sheets

INTEGRITY PROTECTION FOR DATA STORAGE

FIELD OF THE INVENTION

The present disclosure relates to integrity protection of data storage, memory caching and cryptography.

BRIEF SUMMARY

In accordance with one embodiment, a method is provided for protecting the integrity of a memory system divided in a plurality of memory blocks each of which has a local sequence number. The method maintains an age counter for each of the memory blocks; maintains an opportunity counter for each of the memory blocks; maintains an epoch counter for the memory system; writes data in a selected memory block; increases the local sequence number of the selected memory block; updates the opportunity counter for the selected memory block if the local sequence number of the selected memory block rolls over; computes a message authentication code (MAC) in the selected memory block based on a global sequence number and the local sequence number; updates the age counter and the opportunity counter for any non-selected memory blocks if the opportunity counter for the non-selected memory blocks does not match the LSB of the epoch counter for the non-selected memory blocks; and computes a new MAC for any memory block for which the updating is performed.

In one implementation, each of the MACs is updated opportunistically (1) after the corresponding age counter rolls over and (2) during the writing of data to the corresponding memory block.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
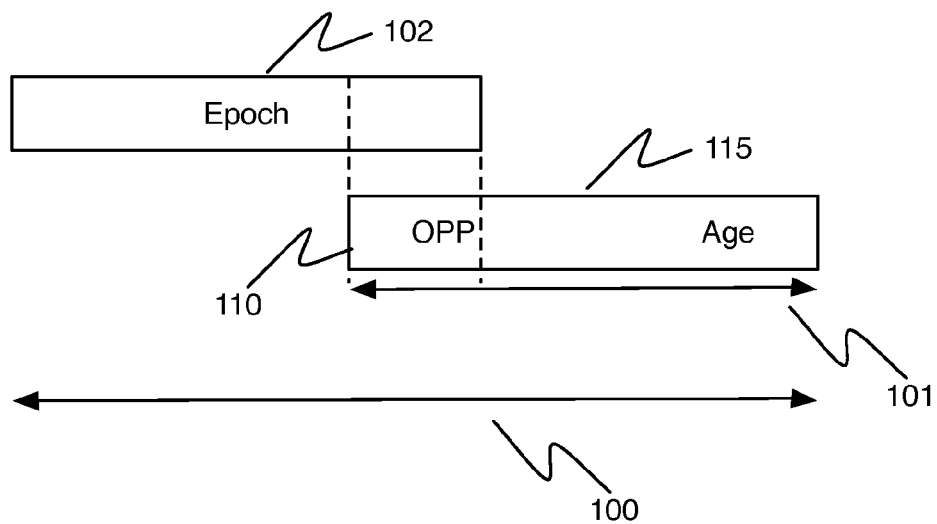
FIG. 1 is a diagram of a global sequence number.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Integrity protection of memory systems located on insecure devices is generally done by computing a cryptographic integrity protection value or Message Authentication Code (MAC) and storing it along with the data. Therefore an unauthorized third party cannot modify the information written in memory.

A MAC algorithm, sometimes called a keyed (cryptographic) hash function (however, a cryptographic hash function is only one of the possible ways to generate MACs), accepts as input a secret key and arbitrary-length data to be authenticated, and outputs a MAC (sometimes known as a tag). The MAC value protects the data integrity as well as its authenticity, by allowing verifiers (who also possess the secret key) to detect any changes to the data content.

When the memory is authentically updated, the MAC is recomputed. To prevent replays of previously authentic values, a unique value, such as a counter or a sequence number, is added to the authentication input.

A MAC is also used when data cache writes out cache-lines to external memory. In this case, to prevent an attacker from replaying previous segments of data, a sequence number is associated to each and every cache line in the memory. Therefore, an attacker cannot capture an image of the external memory and after the memory has been updated, replace the cache-lines within the memory with a previously captured version.

Generally, to avoid long delays when writing new data to memory, the memory is segmented into memory blocks, and a MAC is stored along with each memory block. A block can be one cache line or a larger memory space. Therefore, the authentication algorithm only needs to be performed over an individual, smaller memory block. However, a separate sequence number needs to be maintained for every memory block. The sequence number needs to be sufficiently large to prevent it from expiring (rolling over) too often. When a sequence number expires, the cryptographic integrity algorithm needs to be re-keyed, which results in re-computing the MAC for all data blocks. During the refresh process, the memory system is not accessible, leading to access delays. Large sequence numbers are therefore preferable, but with a large number of blocks, a substantial amount of sequence number data needs to be stored and maintained.

An existing solution is to maintain a small local sequence number per memory block and a global epoch counter. The epoch counter and the local sequence number are concatenated to form the sequence number applied to the integrity algorithm. However, any time the epoch counter is updated, each MAC needs to be updated. The memory system is not accessible during the refresh process.

There is a need to reduce the storage requirements to maintain the sequence numbers while minimizing refresh events and access delays. There is a need to update MAC opportunistically during normal data updates or in the background such that the memory is still accessible when the epoch counter is updated.

In one embodiment, referring to FIG. 1, a global sequence number 100 comprises a local sequence number 101 and a global epoch counter 102. The local sequence number 101 is subdivided into two fields: an opportunity counter 110 and an age counter 115. An instance of the local sequence number 101 is maintained for every external cache line or memory block. All local sequence numbers reset to zero on key initialization.

The global epoch counter 102 is a counter global to all blocks. The opportunity counter 110 allows the MAC to be updated opportunistically after the age counter 115 rolls over, during normal updates (writes) of the data block. It also allows the MAC to be refreshed to new epoch values off-line.

The width of the age, opportunity, and epoch counters can be tuned to trade-off the frequency of epoch update, off-line integrity check refresh to new epoch values, and opportunistic epoch updates versus memory storage requirements for the counter values.

As an example, a 32-bit global sequence number can include a 4-bit age counter and a 2-bit opportunity counter.

The epoch counter 102 and the age counter are concatenated to form the full sequence number used in computing the integrity protection value. The Least Significant Bits (LSB) of the epoch counter are inferred by comparing the global epoch counter 102 to the local opportunity counter 110.

Every time a cache line is written to external memory, the opportunity counter 110 is compared to the LSB of the epoch counter 102. If they match, the age counter is incremented by 1. If the age counter wraps (carries into the opportunity counter), the epoch counter is incremented by 1. When the epoch counter increments, all local sequence numbers need to be checked, and every line that has an opportunity counter matching the LSB of the new epoch, needs to immediately have its MAC recomputed with the new sequence number.

The opportunity counter allows an offline update or refresh of the MAC when the epoch counter changes. A background process or thread may update the local sequence numbers so that the opportunity counters are in sync with the current epoch. This can occur when the cache is not busy, i.e., on a low priority process. Whenever a MAC refresh operation is performed, the age counter resets to zero, to minimize the need for epoch updates. When a line is to be written back into memory, and the opportunity counter does not match the current epoch, the opportunity counter is set to match prior to computing the MAC, and the age counter is reset to zero. The MAC corresponding to the line is therefore refreshed opportunistically.

The refresh process of an external cache line MAC value is performed by reading in the cache-line and validating the MAC. The new MAC is computed using the updated global sequence number.

As the epoch counter exceeds predetermined thresholds, interrupts are optionally generated to the processor at various thresholds to prompt a proactive rekey operation before the counter expires.

Optionally, a background process checks the opportunity counters and updates the MAC for any opportunity counter that is about to expire (for example the memory blocks that are 1 bit away from the LSB of the epoch. During the background process any memory block MAC can be updated based on a pre-determined policy. This maximizes the time a cache-line can be opportunistically updated before getting hit with a refresh, and still allows the refresh to run as a background process.

Figure 2:
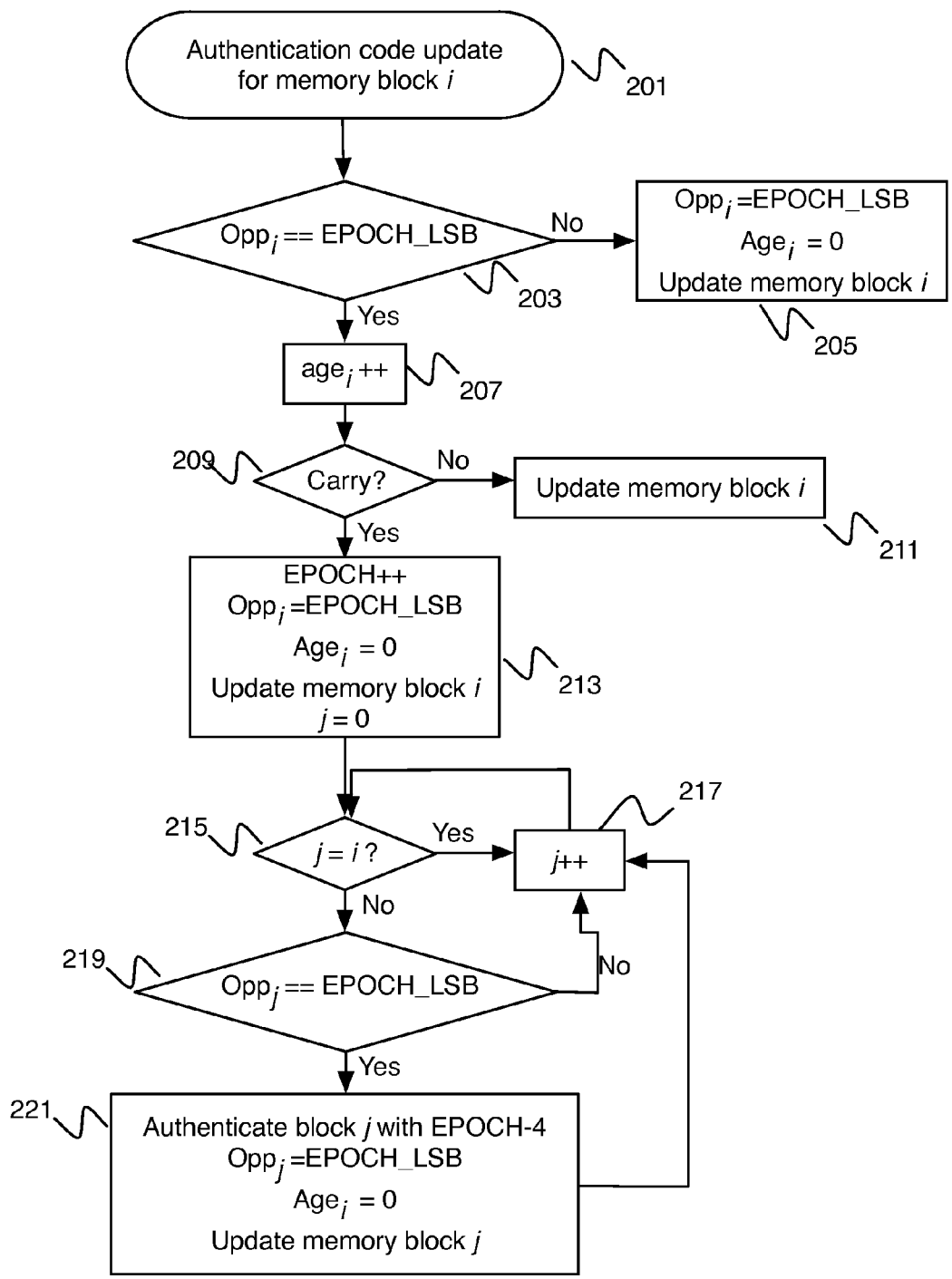
FIG. 2 is a flow chart of an example of the use of a local sequence number with an opportunity counter.

FIG. 2 shows an example flow chart of an embodiment when an authentication code is updated for a memory block i is initiated at step 201. If step 203 determines that the opportunity counter for block i is different from the LSB of the epoch counter at step 203, the local sequence number is from a different epoch, then step 205 sets the opportunity counter for block i to the LSB of the epoch counter and resets the age counter for block i to zero. Otherwise, the local sequence number is in the current epoch, and step 207 increments the age counter for block i is incremented. If the age does not roll (i.e., there is no carry) at step 209, the memory block i is updated with the new sequence number at step 211. If the age rolls (i.e. resets to zero) at step 209, the epoch counter needs to be updated at step 213, the opportunity counter for block i is set to the LSB of the epoch counter and the age is reset to 0. The memory block i is updated accordingly. All memory blocks j are checked at step 219 except for the one that was just updated at step 213 which is skipped by the If step 215. If the opportunity counter for block j is equal to the LSB of the epoch counter at step 219, then the opportunity counter has fallen behind by a number of epochs represented by the number of bits in the opportunity counter (in this example, four epochs, because the opportunity counter is 2 bits), and the MAC of memory block j needs to be refreshed at step 221. If the opportunity counter for block j is not equal to the LSB of the epoch counter at step 219, then no update is necessary for block j, and the next block is checked by incrementing the value of j at step 217.

The above embodiment can also be used for encrypted memory systems.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method of protecting the integrity of a memory system divided in a plurality of memory blocks each of which has a local sequence number, said method comprising:

maintaining an age counter for each of said memory blocks;

maintaining an opportunity counter for each of said memory blocks;

maintaining an epoch counter for the memory system;
writing data in a selected memory block;
increasing said local sequence number of said selected memory block;
incrementing said epoch counter if said age counter of said selected memory block rolls over;
computing a message authentication code (MAC) in said selected memory blocks-based on a portion of a global sequence number that includes said local sequence number and said epoch counter;
updating said age counter and said opportunity counter for any non-selected memory blocks if the opportunity counter for said non-selected memory blocks match the LSB of the epoch counter for said non-selected memory blocks; and
updating said epoch counter, where said epoch counter is updated while said memory system remains accessible, and
computing a new MAC for any memory block for which said updating is performed.

2. The method of claim 1 in which each of said MACs is updated after the corresponding age counter rolls over and during the writing of data to the corresponding memory block.

3. The method of claim 1 in which all local sequence numbers are reset to zero on key initialization.

4. The method of claim 1 in which said local sequence number for a memory block includes the values of the opportunity counter and the age counter associated with that memory block.

5. The method of claim 1 in which said MACs are refreshed to new epoch values off-line.

6. The method of claim 1 in which the epoch counter and the age counter for a selected memory block are concatenated to form a sequence number.

7. The method of claim 1 which includes comparing the value of the opportunity counter with the least significant bits of the epoch counter, and incrementing the age counter if they are equal.

8. The method of claim 1 which includes updating or refreshing a MAC when the corresponding epoch counter changes.

9. The method of claim 1 which includes updating the local sequence number so that the corresponding opportunity counters are synchronized with the corresponding epoch counters.

10. The method of claim 1 which includes refreshing a MAC when the corresponding age counter resets to zero.

* * * * *